United States Patent
Meiners et al.

[15] 3,650,541
[45] Mar. 21, 1972

[54] FLEXIBLE REACH

[72] Inventors: Elmo R. Meiners, Anchor, Ill. 61720; John O. Bradford, Gibson City, Ill.

[73] Assignee: said Meiners, by said Bradford

[22] Filed: Mar. 5, 1970

[21] Appl. No.: 16,813

[52] U.S. Cl. ...................................................... 280/140
[51] Int. Cl. ............................................................ B62d 9/00
[58] Field of Search .................................................. 280/140

[56] References Cited

UNITED STATES PATENTS 54,001  4/1866  Miles .................................... 280/140

1,000,171  8/1911  Hoffman .................................. 280/140

*Primary Examiner*—Philip Goodman
*Attorney*—Molinare, Allegretti, Newitt & Witcoff

[57] ABSTRACT

An improved flexible reach for attaching the front and rear wheels of a farm wagon or the like includes an outer channel member connected with the rear pair of wheels and an inner channel member connected with the front pair of wheels. The channel members are longitudinally slidable one within the other and have a rectangular cross section. A pin fastens the channel members together to provide a desired wheel base for the farm wagon.

3 Claims, 4 Drawing Figures

Patented March 21, 1972
3,650,541
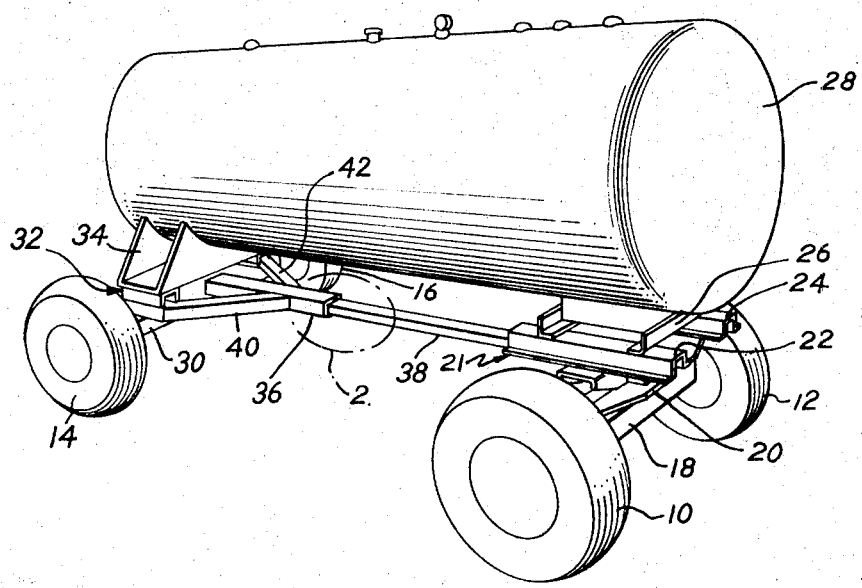
INVENTORS
ELMO R. MEINERS
& JOHN O. BRADFORD
BY
M.Linne, Allegretti, Newitt & Witcoff
ATTORNEYS

3,650,541

FLEXIBLE REACH

BACKGROUND OF THE INVENTION

This invention relates to the improvement in a wheeled vehicle of a flexible reach for connecting pairs of wheels of the vehicle together.

Four-wheeled vehicles such as farm wagons or the like include a front and rear pair of wheels, each pair mounted on its own separate axle. A flexible reach interconnects the separated pairs of wheels. The reach typically comprises a cylindrical tube extending from one pair of wheels in a direction longitudinal to the path of vehicle travel and a second cylindrical rod or pole extending from the other pair of wheels. The rod is adapted to nest within the tube. A locking ring is provided for fastening the tube and cylindrical rod together to achieve the desired length of wheel base. The locking ring is constructed to permit rotational movement of the rod within the tube so that the front pair of wheels will rest on the ground even though the front wheels are canted in respect to the rear wheels.

The cylindrical configuration of the flexible reach is utilized to provide maximum rigidity for the reach which structurally interconnects the pairs of wheels. Because of the rigidity of the cylindrical reach, however, the special locking ring connection described above and illustrated in FIG. 4 of the drawing is required.

SUMMARY OF THE INVENTION

In a principal aspect the present invention comprises an improved flexible reach for connecting pairs of wheels. The reach includes an outer reach and an inner pole adapted to nest therein. Both the reach and pole have substantially identical, noncircular cross sections. Connecting means are provided to fasten the reach and pole together.

It is thus an object of the present invention to provide an improved flexible reach construction.

It is a further object of the present invention to provide a flexible reach construction which is easily adjustable.

Still another object of the present invention is to provide a flexible reach construction with a reach having a noncircular cross section. The reach is adapted to flex thereby permitting connected pairs of wheels to remain in position on the surface of the ground.

One further object of the present invention is to provide a flexible reach construction which is substantially more economical to manufacture and assemble.

These and other objects, advantages and features of the present invention will be set forth in greater detail in the following description.

BRIEF DESCRIPTION OF THE DRAWINGS

In the detailed description which follows reference will be made to the drawing comprised of the following figures:

FIG. 1 is a perspective view of a typical four-wheel wagon utilizing the improved flexible reach construction of the present invention;

FIG. 2 is a perspective view of the improved flexible reach construction of the present invention at the position of connection of the reach and pole shown in FIG. 1;

FIG. 3 is a cross-sectional view of the improved flexible reach construction taken substantially along the line 3—3 in FIG. 2; and FIG. 4 is a perspective view of a typical prior art construction for a flexible reach.

DESCRIPTION OF THE PREFERRED EMBODIMENT

FIG. 1 is a perspective view of a typical farm wagon with the improved flexible reach construction of the present invention. The wagon includes a forward pair of wheels 10 and 12 and a rear pair of wheels 14 and 16. The forward wheels 10 and 12 are mounted on a forward axle 18. The axle 18 is, in turn, part of a forward axle assembly 21 at the forward end of the wagon. The forward axle assembly 21 includes forward tank support members 22 and 24 attached to a fifth wheel construction 20 for cooperation with a forward tank cradle member 26. A tank 28 is supported on cradle 26 over the front axle 18. The fifth wheel construction 20 is constructed to rotate about a center pivot axis so that the front wheels 10 and 12 may be turned.

The rear wheels 14 and 16 are attached to the outer ends of a rear axle 30. A rear axle assembly 32 and a rear tank cradle 34 are positioned on the axle 30 to support the tank 28. A flexible reach construction of the invention connects the rear axle assembly 32 with the front tank support members 22 and 24.

The flexible reach construction of the invention is comprised of a rear reach 36 and an inner reach pole 38 which is nested within the outer reach 36. Hounds 40 and 42 are welded between the rear reach 36 and the rear axle assembly 32 to provide stability and support to the rear reach 36.

Referring now to FIGS. 2 and 3, the improved flexible reach construction of the present invention is illustrated in greater detail. The rear reach 36 has a substantially hollow rectangular cross section and in the specific example shown is a three sided channel member with flanges 37 and 39 provided on the fourth side. The inner reach pole 38 is similarly constructed and adapted to nest within the rear reach 36. The flanges 37 and 39 serve to keep the inner pole 38 aligned within the reach 36 and are therefore preferred. Corresponding flanges as at 41 and 43 on pole 38 are not as necessary on the inner pole 38 but they are preferred.

First and second bolts 44 and 46 pass through openings as at 48, 49 and 50, 51 in the rear reach 36 and inner pole 38, respectively. The bolt as at 44 cooperates with a nut as at 52 in FIG. 3 and is thus retained in a fastened position through the reach 36 and pole 38. The bolts 44 and 46 prevent longitudinal movement or sliding of the pole 38 within the reach 36. The reach construction may be adjusted to change the wheel base of the wagon by removing the bolts 44 and 46 and sliding the inner pole 38 to a new position. The bolts 44 and 46 are then passed through different openings in the inner pole. Opening 54 in FIG. 3 is an example.

The rear reach 36 has been illustrated cooperating with pole 38. Of course, a separate front reach can be provided to cooperate with a pole. Thus, a single pole can cooperate with either one or two reaches respectively at either the rear or forward end or both ends of a wagon. Additionally, a plurality of reach constructions can be provided for a single wagon, although a single reach construction is preferred.

Referring now to FIG. 4, a prior art flexible reach construction is illustrated. In the prior art construction a cylindrical outer tube 56 cooperates with a concentric inner pole 58. An outer ring 60 having the same diameter as the tube 56 is attached by means of welded plates 62 and 64 to the tube 56 at a fixed spaced distance from the end of the tube 56. A floating spacer ring 66 is positioned between the outer ring 60 and the tube 56. The pole 58 is inserted through the outer ring 60, spacer ring 66 and tube 56 to provide the desired wheel base. A bolt 68 is then positioned through appropriate openings in the spacer ring 66 and a corresponding opening in the pole 58 in order to prevent any longitudinal movement of the pole 58 with respect to the tube 56.

With the prior art construction illustrated in FIG. 4, both forward wheels of a wagon could rest on a surface having a different plane from the surface on which the rear wheels rested. The pole 58 can rotate freely through a given arc limited by plates 62 and 64 about the longitudinal axis of the flexible reach. This results since the spacer ring 66 is freely rotatable in the space between the outer ring 60 and tube 56. This degree of freedom provided by the spacer ring 66 is necessary with the cylindrical reach since the torsional forces which would build up in the reach were rotation not possible might cause the reach to fracture or fail or alternatively would prevent all the wheels of a wagon from resting on the ground.

In the improved construction of the present invention, the spacer ring construction has been eliminated. Because of the noncircular cross section of the reach of the present invention, flexure of the reach is possible without the attendant possibility of failure of the reach. The noncircular cross section of the improved reach of the present invention makes this possible.

As disclosed, the rear reach 36 and inner pole 38 are preferably channel beams having a rectangular cross section. The thickness $t$ as well as the ratio of the height $h$ to the width $w$ is dependent upon the flexural requirements and the load rating of the running gear. Various other parameters will also effect the dimensions of the reach and pole including the reach construction material and the wagon wheel base. Thickness $t$ is preferably the same for both reach 36 and pole 38 so that various stresses are more or less evenly distributed along the length of the reach construction. These dimensions will most likely be determined empirically. Calculations of the bending stresses can be quickly and easily performed in order to determine specifications of materials which will have a safe working stress. However, calculations of torsional stress will most likely be avoided in favor of empirical specifications. The objective is to specify materials resistant to bending stresses but not resistant to torsional stresses. The configuration of the reach construction claimed enables one to easily perform this task of selection of proper materials and dimensions.

As can be appreciated, these values may be varied depending upon the particular metal utilized in the construction of the reach, the cross-sectional configuration of the reach and the loads for which the wagon is designed. It is contemplated that additional noncircular cross section beams can be provided having the features of the present invention. Thus, the scope of the invention is to be limited only by the following claims and their equivalent constructions.

What is claimed is:

1. In a vehicle of the type having at least a forward running gear and a rear running gear, an improved flexible reach construction for connecting said running gear comprising, in combination at least one outer reach connected with one running gear, said outer reach comprising a longitudinal channel member having at least one open side and inwardly turned flange means terminating in said one open side;

an inner pole connected with the other running gear, said inner pole having a cross section corresponding to said outer reach and adapted to nest longitudinally within said outer reach; and at least one removable connecting means for fastening said outer reach and said inner pole together.

2. The improved flexible reach construction of claim 1 wherein said connecting means comprises a pin passing transversely through said inner pole and outer reach.

3. The improved flexible reach construction of claim 1 wherein said reach and pole are substantially rectangular in cross section.

* * * * *